US010754997B1

(12) United States Patent
Daily et al.

(10) Patent No.: US 10,754,997 B1
(45) Date of Patent: Aug. 25, 2020

(54) SECURITY DATA DIODE

(71) Applicant: The University of Tulsa, Tulsa, OK (US)

(72) Inventors: Jeremy Daily, Broken Arrow, OK (US); Hayden Allen, Owasso, OK (US)

(73) Assignee: The University of Tulsa, Tulsa, OK (US)

( * ) Notice: Subject to any disclaimer, the term of this patent is extended or adjusted under 35 U.S.C. 154(b) by 306 days.

(21) Appl. No.: 15/608,299

(22) Filed: May 30, 2017

(51) Int. Cl.
*G06F 21/85* (2013.01)
(52) U.S. Cl.
CPC .................................. *G06F 21/85* (2013.01)
(58) Field of Classification Search
CPC ....................................................... G06F 21/85
USPC ........................................................ 710/100
See application file for complete search history.

(56) References Cited

U.S. PATENT DOCUMENTS

| | | | | |
|---|---|---|---|---|
| 3,979,673 A * | 9/1976 | Martin | ................. | H04B 5/0018 455/14 |
| 5,999,389 A * | 12/1999 | Luebke | ................... | H04L 69/40 361/67 |
| 6,324,044 B1 * | 11/2001 | Teggatz | ................ | G06F 13/385 327/379 |
| 9,620,952 B2 * | 4/2017 | Moen | ...................... | H02H 3/023 |
| 2003/0145121 A1 * | 7/2003 | Watkins | ................ | G06F 13/385 709/250 |
| 2005/0285665 A1 * | 12/2005 | Donaldson | ............. | G11C 5/145 327/530 |
| 2006/0018063 A1 * | 1/2006 | Boezen | ............... | H01L 27/0248 361/56 |
| 2008/0180226 A1 * | 7/2008 | Schmidt | ............ | G05B 19/0428 340/286.01 |
| 2010/0033163 A1 * | 2/2010 | Ahrens | ................... | H04L 25/08 324/76.11 |
| 2010/0277217 A1 * | 11/2010 | Takarada | ....... | H03K 19/018592 327/419 |
| 2011/0158258 A1 * | 6/2011 | Suzuki | ............. | H04L 12/40032 370/475 |
| 2013/0051435 A1 * | 2/2013 | Van de Maele | ........ | H04L 12/12 375/211 |
| 2014/0380001 A1 * | 12/2014 | Schubert | ............... | G06F 9/5077 711/153 |
| 2015/0010017 A1 * | 1/2015 | Kraly | ................ | H04L 12/40032 370/468 |
| 2015/0029626 A1 * | 1/2015 | Yang | ...................... | H04L 43/08 361/57 |
| 2016/0121818 A1 * | 5/2016 | Walker | .................. | H02H 9/043 307/9.1 |

OTHER PUBLICATIONS mBus An Overview of Controller Area Network (CAN) Technology, Nov. 12, 2003 (Year: 2003).*

* cited by examiner

*Primary Examiner* — Paul R. Myers
(74) *Attorney, Agent, or Firm* — Gable Gotwals

(57) ABSTRACT

A controller area network (CAN) controller and transceiver device implementing an output CAN network as a mirror of an adjacent connected input CAN network, the output CAN network and the input can network both comprising at least first data wires. The system includes a first diode device interposing the input and output CAN networks such that a signal on the first data wire of the input CAN network can propagate to the first data wire of the output CAN network but not vice versa.

4 Claims, 12 Drawing Sheets

US 10,754,997 B1

SECURITY DATA DIODE

FIELD OF THE INVENTION

This disclosure relates to secure networks in general and, more particularly, to a system and method for secure access to a non-centralized bus architecture.

BACKGROUND OF THE INVENTION

Security of computer networks used to be a concern primarily of those relying specifically upon computers for work or research and whose computers were connected via various network schemes to be able to exchange data or share resources. Initially, the majority of computer networks were limited in scope to a single office or perhaps a single building. If a computer was available in the home, it was generally a standalone device.

With the advent of the Internet, computers all over the world became essentially networked together. Even home computers may be networked together via Wi-Fi and recent research reveals that well over half of U.S. households have Internet access in the home. As the interconnectedness of personal and work computers has increased, cybersecurity threats have grown. Malicious websites, hacking, and phishing scams are now common. Responses to these threats have grown increasingly sophisticated as well but it is unlikely that any networked computer system can be made absolutely un-hackable while retaining acceptable usability.

The increasing availability of robust microcontrollers at lower costs has also resulted in the computerization of more and more automotive systems. Engines, transmissions, anti-lock braking systems, suspensions, instrument displays and many more vehicle systems are now commonly operated by a microcontroller. A driver of a vehicle may not realize that he or she may be less in control of the vehicle systems than providing inputs to microcontrollers that, in turn, operate the vehicle systems. Furthermore, it is not simply passenger vehicles that are highly computerized but many if not most commercial vehicle systems as well.

It is often useful or necessary that one vehicle computer or microcontroller be able to communicate with another (for example, the response of an engine to driver inputs may depend in part on the state of the transmission). Therefore, protocols have been developed that provide for networking ability within the vehicle itself. One such protocol for allowing communications between computerized systems on the same vehicle is the Controller Area Network (CAN) bus. This is a widely-deployed standard allowing various vehicle subsystems to communicate without a centralized host computer dedicated to the task. More information about the CAN standard is specified in ISO 11898-1, ISO 11898-2, and ISO 11898-3 available from the International Organization for Standardization. Although the CAN bus is widely implemented in automobile systems (including heavy commercial vehicles), it is not necessarily limited to this application.

Computers and microcontrollers deployed in automotive systems are generally not programmable via the normal vehicle controls and, if so, the extent of programming is very limited (for, example, programming an automatic seat adjustment setting). This preserves some security and integrity for all of the automotive systems on the bus. However, there is currently no fundamental barrier to preventing a compromised device or controller with access to the vehicle bus from being able to provide malicious or simply unwanted data or commands on to the bus. Stories have already been reported of the ability of hackers, at least conceptually, to hack vehicle systems.

Another issue that may further degrade the security of electronic components on a vehicle data bus is the increasing presence of devices and systems that are not only given access to the vehicle data bus, but also to the Internet at large. Systems exist today that access data via a CAN bus or other system and share such data over the internet via satellite or other means. One class of such devices are so called electronic logging devices (ELD) that are becoming mandated for hours of service tracking for commercial vehicles. Such devices access the CAN bus to receive such information as when a vehicle is moving or whether it is running. Some ELD devices share data with a remote host computer via satellite and/or other internet connections. Although every effort may be made to ensure the security and integrity of the ELD or other device accessing the vehicle data bus, some means of physical security is currently believed to present the only full-proof way to address the issues.

What is needed is a system and method for addressing the above, and related, issues.

SUMMARY OF THE INVENTION

The invention of the present disclosure, on one aspect thereof, comprises a system having a first data bus having at least a two wire implementation including a first high wire and a second low wire with a differential voltage between the high and low wires used to transmit data. The system includes a first one way bridge between the first high wire and a high wire from an adjacent data bus having a second two implementation including a second high wire and a second low wire with a differential voltage between the high and low wires used to transmit data. The system includes a second one way bridge between the first low wire and the second low wire. The first data bridge allows the first high wire to be pulled high by the second high wire but prevents the first high wire from pulling the second high wire high. The second data bridge allows the first low wire to be pulled low by the second low wire but prevents the first low wire from pulling the second low wire low.

In some embodiments, the first data bridge comprises a first diode arranged with a cathode on a same potential with the first high wire, and the second data bridge comprises a second diode arranged with an anode on a same potential as the first low wire. The system may further comprise a controller area network (CAN) bus controller and transceiver integrated circuit device operating the first data bus implementation. The first high and low wires may comprise a nominal 120 ohm twisted pair. In another embodiment, a pair of 120 ohm resistors each interpose the first low wire and the first high wire.

In some embodiments the first one way bridge comprises a first data transceiver in full communication with the first high wire and first low wire of the first data bus implementation with access to read and control the differential voltage between the first high wire and first low wire, but isolated from reading or controlling the differential voltage of the second data bus implementation, and a second data transceiver in full communication with the second high wire and second low wire of the second data bus implementation with access to read and control the differential voltage between the second high wire and second low wire, but isolated from reading or controlling the differential voltage of the first data bus implementation. The first data transceiver receives an indication of the state of the second high wire from the second data transceiver and mirrors the state of the second high wire on the first high wire but does not return the state of the second high wire to the second data transceiver.

In such embodiments, the second one way bridge comprises the first data transceiver receiving an indication of the state of the second low wire from the second data transceiver and mirroring the state of the second low wire on the first low wire but not return the state of the second low wire to the second data transceiver.

Such systems may further comprise a controller area network (CAN) bus controller and transceiver integrated circuit device operating the first data bus implementation to provide at least acknowledgement signals to devices on the first data bus. The first high and low wires comprise a nominal 120 ohm twisted pair or may the system may comprise a pair of 120 ohm resistors each interposing the first low wire and the first high wire.

The invention of the present disclosure, in another aspect thereof, comprises a controller area network (CAN) controller and transceiver device implementing an output CAN network as a mirror of an adjacent connected input CAN network, the output CAN network and the input can network both comprising at least first data wires. The system includes a first diode interposing the input and output CAN networks such that a signal on the first data wire of the input CAN network can propagate to the first data wire of the output CAN network but not vice versa. The system may include a second diode interposing the input and output CAN networks such that a signal on a second data wire of the input CAN network can propagate to a second data wire of the output CAN network but not vice versa.

In some embodiments, the CAN controller and transceiver implements the output CAN network as a two wire network with the first data wire of the output CAN network as a high wire and the second data wire of the output CAN network as a low wire.

The invention of the present disclosure, in another aspect thereof, comprises a device including a controller area network (CAN) controller and transceiver device implementing an output CAN network as a mirror of an adjacent connected input CAN network, the output CAN network and the input can network both comprising at least first data wires. A transmitting network node operatively couples to the first data wire of the input CAN network, and a receiving network node operatively coupled to the first data wire of the output CAN network. The transmitting network node provides a signal from the first data wire of the input CAN network to the receiving network node, and the receiving network node echoes the signal from the first data wire of the input CAN network to the first data wire of the output CAN network. The transmitting network node is inoperable to echo the state of the first data wire of the output CAN network to the first data wire of the input CAN network. In some embodiments, the receiving network node cannot receive data or voltage levels except from the input CAN network.

Some embodiments further comprise a requesting network node communicatively coupled to the first data wire of the input CAN network and transmitting a request to the input CAN network. In such case, the transmitting network node may detect a reply to the request on the first data wire and transmits the reply to the receiving network node, which outputs the reply on the first data wire of the output CAN network.

In some embodiments, the transmitting network node detects the signal as a voltage differential between the first data wire and a second data wire of the input CAN network and receiving network node echoes the signal as a voltage differential between the first data wire and a second data wire of the output CAN network. Here again, such a system may include a requesting network node communicatively coupled to the first data wire of the input CAN network and transmitting a request to the input CAN network. The transmitting network node may detect a reply to the request on the first data wire and transmit the reply to the receiving network node, which outputs the reply on output CAN network.

DETAILED DESCRIPTION OF THE PREFERRED EMBODIMENTS

Figure 1:
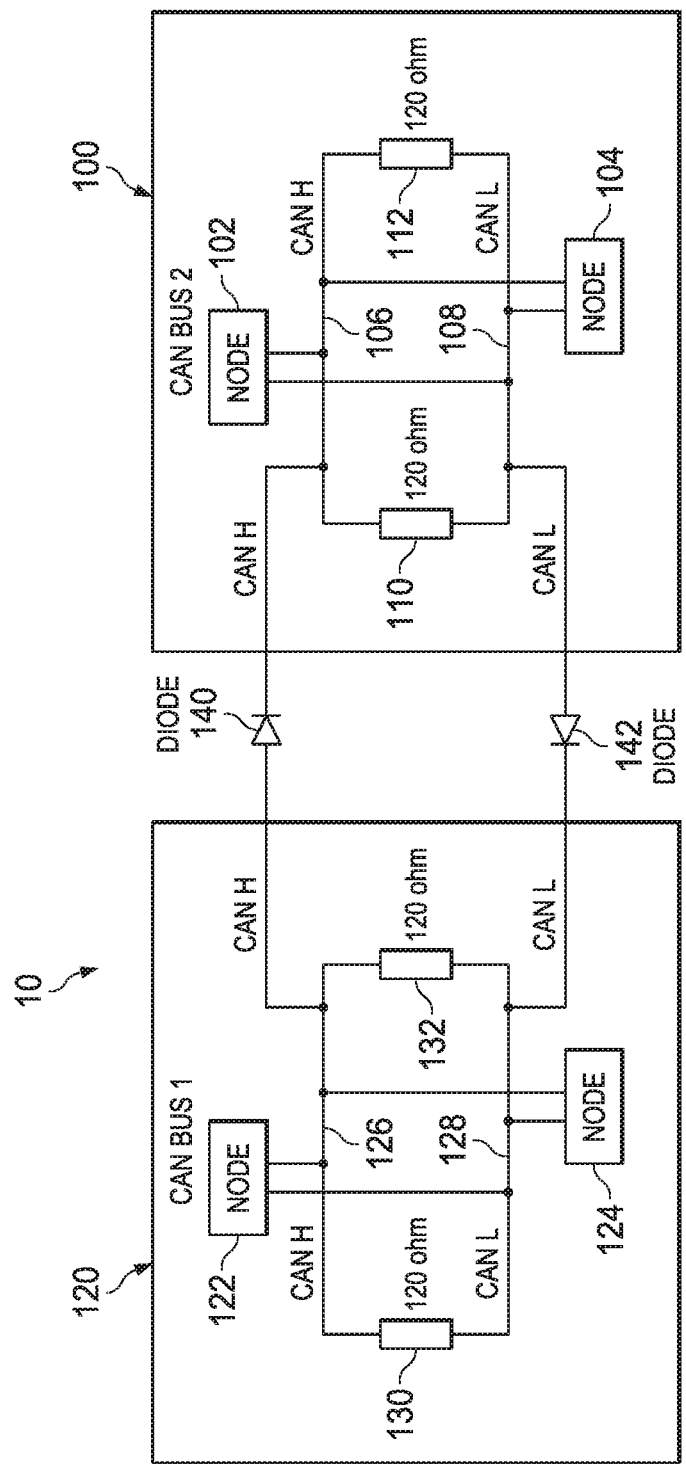
FIG. 1 is a simplified schematic of a system having a data bus with secure read-only access to a second data bus according to aspects of the present disclosure.

Referring now to FIG. 1, a simplified schematic of a system 10 having a data bus 100 with secure, read-only access to a second data bus 120 according to aspects of the present disclosure. The data bus 100 may be implemented as a controller area network (CAN) bus for secure, read-only access to another CAN bus 120. Although the specific examples of the various embodiments of the present disclosure are given in terms of various CAN bus configurations, it should be understood that the systems and methods disclosed herein may be suitable for use on any data network in which signals are propagated by driving a data wire high or low or by forcing a voltage differential between two data wires.

CAN buses are known in the art and most commonly used to allow microcontrollers and other devices to communicate with one another without a host computer. CAN buses may be commonly found in automotive applications but are not limited to such. Of particular (but not exclusive) interest with respect to the present disclosure, are CAN bus implementations as components of commercial vehicles. Commercial vehicles are subject to much more strict regulation than passenger vehicles. Certain regulations now (or will soon) require aftermarket equipment to have access to data that is exchanged or available on a CAN bus of the commercial vehicle. Alternatively, the vehicle itself would be required to make such a data available to a communication system that also connects to data networks outside the vehicle (e.g., Bluetooth or Wi-Fi). One example of such regulation is electronic reporting of hours of service for commercial vehicles over a certain weight. The time the vehicle is operational or in motion, for example, may be captured via the CAN bus and used for reporting and compliance purposes. As discussed above, the potential for hacking or cracking of such systems that could potentially allow an outsider to control CAN bus operations could have serious consequences.

The present disclosure provides for a number of systems and methods by which certain networks (including CAN buses) may be accessed for data gathering or reporting purposes without the potential for the data bus of an operating vehicle (or other critical system) to be influenced by a compromised or otherwise errant device. In FIG. 1, a device according to the present disclosure implements a first CAN bus 100. The CAN bus 100 comprises data nodes 102, 104 each connected (via a so-called stub) to a high wire 106 and a low wire 108. The nodes 102, 104 can communicate with one another (or any other node on the network) via driving a differential voltage between the high wire 106 and low wire 108 according to the various CAN protocols.

Some CAN buses operate with a single wire. These are two wire systems with the low wire held at a common ground reference. The CAN buses 100, 120 of the present embodiment are two wire systems. The high wire 106 and low wire 108 may be terminated by resistors 110, 112. These may be 120 ohm resistors according to CAN standards. In another embodiment, the high wire 106 and low wire 108 are a twisted pair of 120 ohm nominal impedance. Single wire implementations do not need protection devices on the ground wire.

In the present embodiment, the CAN bus 200 is shown as a functional mirror of the CAN bus 100. The CAN bus 200 includes two data nodes 122, 124. These nodes 122, 124 may represent microcontrollers of various systems and subsystems relying on the CAN bus 200 for communication. If the CAN bus 200 is part of an automobile or heavy vehicle the data nodes 122, 124 may include engine controllers, transmission controllers, braking and suspension controllers and others such devices. It should also be understood that more than two nodes may be configured to access the CAN bus 200.

The CAN bus 200 is illustrated as having a high wire 126 and a low wire 128, both of which are accessed by all nodes 122, 124 on the CAN bus 200. The high wire 126 and low wire 128 are joined by a pair of terminating resistors 130, 132, which may have an impedance of 120 ohms each. The high wire 126 and low wire 128 may also be configured as a twisted pair cable with a nominal impedance of 120 ohms. If the CAN bus 200 is a single wire bus, all nodes 124, 126 will connect only to a single common signal wire.

The CAN bus 100 and the CAN bus 200 could simply be connected by jumping the respective high wires 106, 126 and low wires 104, 124 to bring them the high wires 106, 126 to the same voltage and the low wires 104, 124 to the same voltage. This would have the effect of creating a single CAN bus to include all of the nodes 102, 104, 122, 124 shown. In such case, the CAN bus 100 would have full access to all data sent on CAN bus 200. However, this would also allow any device on the CAN bus 200 to send data that could be received by any node on the CAN bus 100. Therefore, such a configuration would be useful for reading data from the CAN bus 100 with a device on the CAN bus 200 but would not protect the CAN bus 100 from an errant or compromised device on the CAN bus 200. For purposes of this example, the CAN bus 200 may represent or comprise an aftermarket device installed onto a vehicle (e.g., a Bluetooth or Wi-Fi enabled data logger).

According to the present disclosure, one solution for securing the CAN bus 100 (and its associated vehicle) from any interference, attack, or compromise from any device on the CAN bus 200, while allowing devices on the CAN bus 200 to access data from the CAN bus 100 is to interconnect the two CAN busses 100, 200 via data diodes 140, 142. The data diodes 140, 142 (and matched transceivers as discussed in some embodiments below) act as one-way data bridges. In single wire CAN bus embodiment, a data diode may be connected between the single signal wire such that changes from CAN bus 100 propagate through to CAN bus 200 but not vice versa. As shown, in a two wire CAN bus system, one data diode 140 connects the respective high wires 102, 106 while another data diode 142 connects the respective low wires 108, 128.

Because a CAN bus operates by driving a voltage between the high wire and low wire, the data diode 140 is connected such that the protected CAN bus 100 high wire 126 can provide voltage/current into the high wire 106 of the reading CAN bus 200, but high voltages on the high wire 106 are not propagated to the high wire 126. In other words, the data diode 140 provides an anode to the CAN bus 100 and a cathode to the CAN bus 200.

To complete the connection in a two wire CAN bus system, the low wire 128 of the protected CAN bus 100 should be able to pull the low wire 108 of the reading CAN bus 200 into a low state but not vice versa. Thus, the data diode 142 is connected to the low wire 108 of the reading CAN bus 100 at the anode and is connected to the low wire 128 of the protected CAN buss 100 via the cathode.

As the present disclosure is, in some respects, directed to systems and methods for allowing devices on an outside CAN bus to read data from a CAN bus that should be protected, the bus that is read or protected (here, 120) may be referred to as an input CAN bus. The CAN bus 100 providing access for external devices, or those that should not be allowed to communicate to the input CAN bus 120 may be referred to as the output CAN bus. It is also the reading CAN bus since it allows for reading only of the CAN bus 120.

It should also be understood that, according to various embodiments of the present disclosure, the data diodes 140, 142 can be implemented in a variety of ways. In one embodiment, they are simply physical diodes. In another embodiment, as explained below, various protection and buffering circuitry may be added. In further embodiments, the data diodes 140, 142 may be implemented as various solid state logical devices that provide security based upon physical configuration (rather than software programming, which could be subject to hacking or other malicious corruption).

Figure 2:
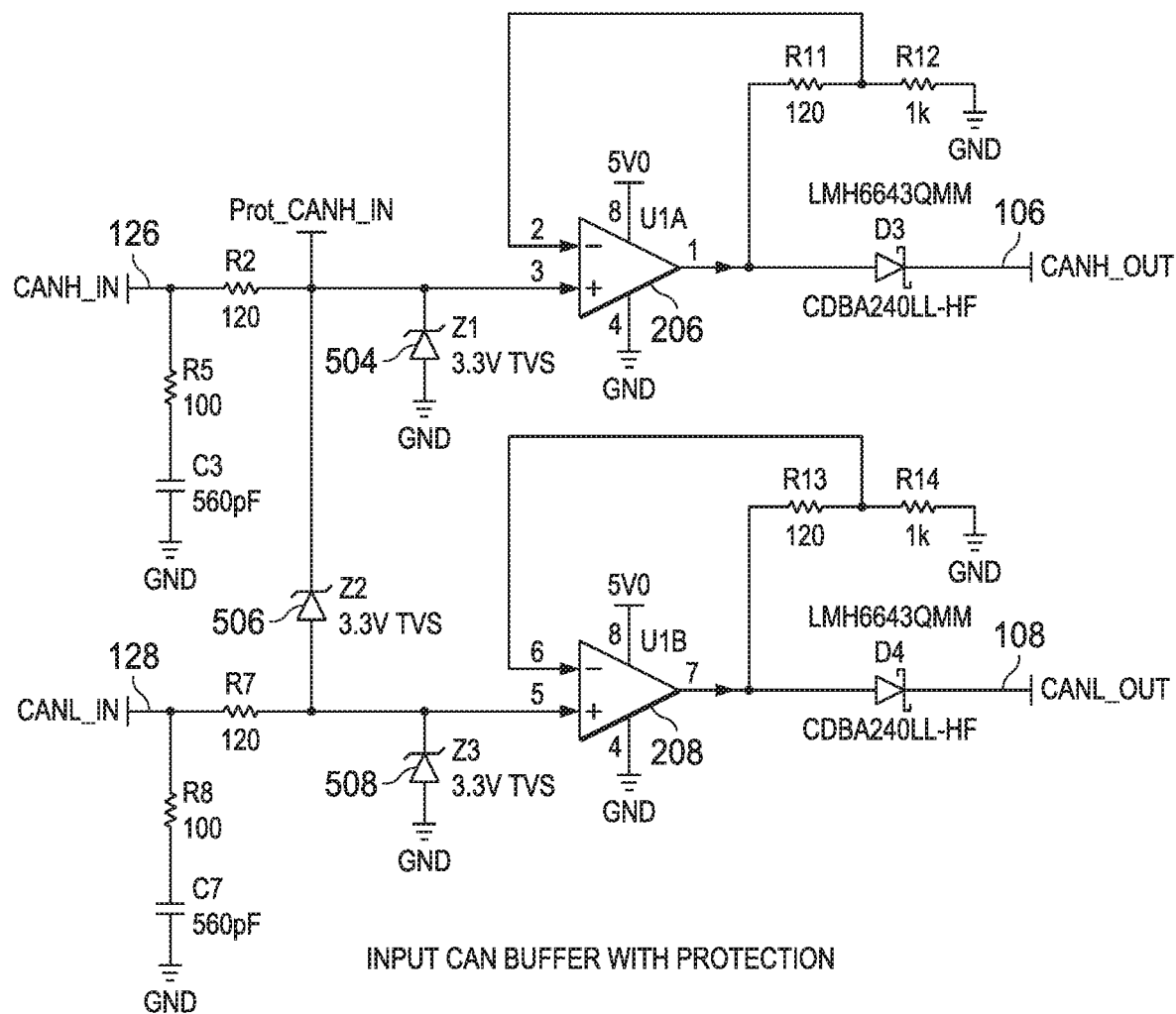
FIG. 2 is a schematic diagram of an arrangement of input safety diodes for a secure data bus access system according to aspects of the present disclosure.

FIG. 2 is, schematic diagram of an arrangement of input safety diodes 140, 142 for a secure data bus access system according to aspects of the present disclosure is shown. Together, FIGS. 2-6 illustrate a complete device schematic for implementing secure CAN bus access system 10. However, each of FIGS. 2-6 are discussed in turn.

The input CAN bus high wire 126 (labeled CANH_IN) is connected to the positive input of an operational amplifier (op-amp) 206 that is arranged in a non-inverting configuration. Op-amps suitable for applications of the present disclosure may be automotive grade op-amps such as the LMH6642Q (single op-amp per chip) or LMH6643Q (two op-amps per chip) from Texas Instruments, or another suitable op-amp. The output from the op-amp 206 may be connected to the diode 106 in a forward bias to the output high wire 106 (anode to the op-amp 206 and cathode to the high wire 106). The diode 106 may be a Schottky diode. Schottky diodes suitable for applications of the present disclosure include part number CDBA240LL-HF from Comchip Technology.

In the configuration shown in FIG. 2, the op-amp 206 and associated circuitry provides a high impedance input buffer that mirrors drives the same voltage signal from high wire 126 to the output CAN bus high wire 106 (labeled CANH_OUT). As discussed below, protection circuitry for the output CAN bus may also be implemented.

The input CAN bus low wire 128 (labeled CANL_IN) is connected to the positive input of another operational amplifier 208, which is also in a non-inverting configuration. The output of op-amp 208 is connected to the cathode side of diode 142. The anode of diode 142 is on the same potential as the output CAN bus low wire 108 (CANL_OUT). Thus, a high impedance for input CAN bus low wire 128 is provided and the potential or signal on low wire 128 can lower the voltage of low wire output 108 but is prevented from raising it.

It should be understood that the schematic diagrams of FIG. 2 are examples only. One of skill in the art may arrange the op-amps or other devices differently to achieve the same effect. It should also be appreciated that the circuitry shown in FIG. 2 may be sufficient for simply mirroring the CAN bus signal of input CAN bus (e.g., CAN bus 120) to a set of outputs 106, 108 in such a way that any voltages applied to the outputs 106, 108 cannot affect voltages (and therefore data) sent over the CAN bus 120. However, in order to make meaningful use of the data on the output side, additional components may be needed.

Figure 3:
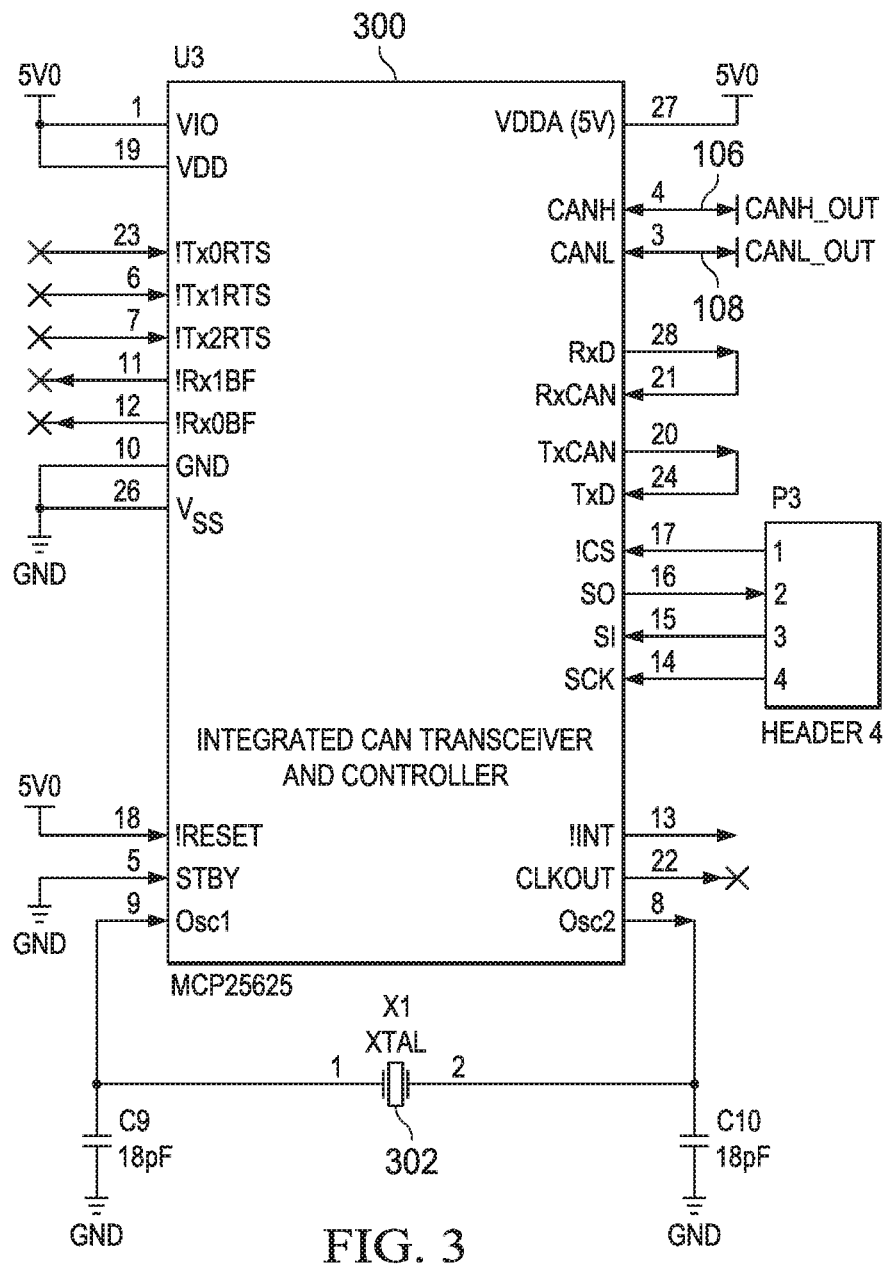
FIG. 3 is a schematic diagram of a controller and transceiver for reporting data obtained securely from a data bus according to aspects of the present disclosure.

Referring now to FIG. 3, a schematic diagram of a controller and transceiver 300 for reporting data obtained securely from a data bus (e.g., output CAN bus 100) according to aspects of the present disclosure is shown. The controller and transceiver device 300 may be considered as one of the nodes 104, 106 of the output CAN bus 100. The device 300 may be a commercially available, automotive grade CAN controller and transceiver such as part number MCP25625 from Microchip. An exemplary pinout with associated circuitry is shown in FIG. 3 but one of skill in the art may arrange a CAN controller differently.

The controller and transceiver 300 may be connected to the output high wire 106 and output low wire 108 in order to receive any communications from the input CAN bus 120. The device 300 is also available for communicating with any other nodes on the output CAN bus 100. The device 300 can alter the voltages (and thus communicate) on the high wire 106 and low wire 108 but these signals are prevented from propagating through to the input CAN bus 120 by the diodes 206, 208 as shown in FIG. 2. Therefore, if the controller 300 (or any other device on the output CAN bus 100) becomes compromised, it will have no effect on the input CAN bus 100 and any critical systems operating thereon. The device 300 (if implemented with an MCP25625 or similar) requires a clock signal. Here a 16 MHz crystal oscillator from TXC is used (part number 7A-16.000MAAJ-T).

Figure 4:
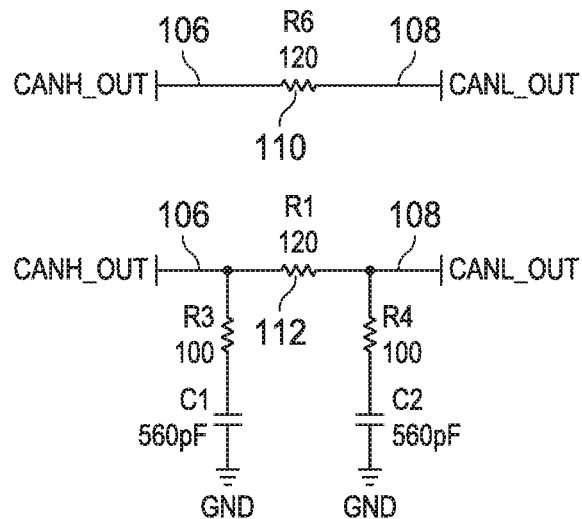
FIG. 4 is a schematic diagram of a suitable output data bus from the controller and transceiver of FIG. 3.

Referring now to FIG. 4 is a schematic diagram of a suitable output data bus from the controller and transceiver of FIG. 3. More particularly, FIG. 4 represents an arrangement of components for completing the output CAN bus according to CAN standards. Here terminating resistors 110, 112 are shown interposing the output high wire 106 (CANH_OUT) and output low wire 108 (CANL_OUT) at either end of the bus. The output CAN bus 100 may also be grounded through a filter network as shown to minimize the effect of noise on the circuitry.

Figure 5:
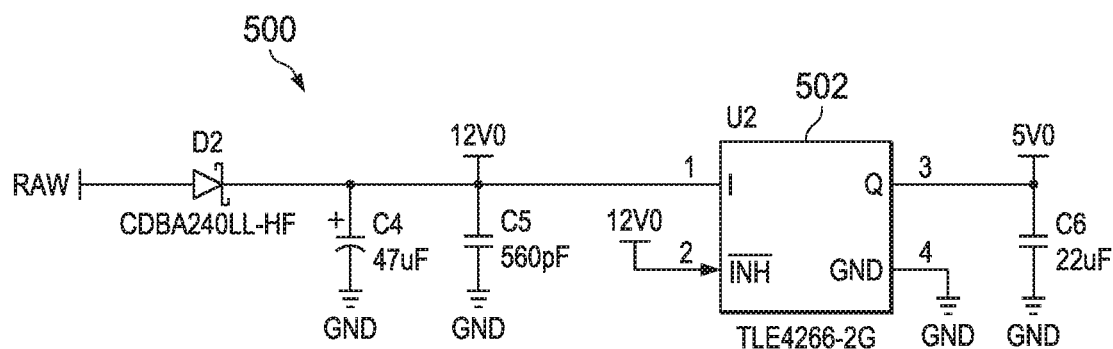
FIG. 5 is a schematic diagram of a suitable power input, protection, and regulation circuit for systems and methods of the present disclosure as embodied in FIGS. 2-4.

Referring now to FIG. 5 a schematic diagram of a suitable power input, protection, and regulation circuit 500 for systems and methods of the present disclosure as embodied in FIGS. 2-4 is shown. The circuit 500 is not part of the CAN bus per se but provides needed power to the devices operating the output CAN bus 100. The primary component of the circuit 500 may be a voltage regulator 502. A suitable device for this role is the Infineon TLE4266-2G. The regulator 502 may be configured such that it is activated only when a high voltage level is connected to its Inhibit pin. The regulator converts an unregulated 12 volt source (e.g., from the automobile, labeled RAW) to a regulated voltage (e.g., 5V or 3.3V) for the circuitry of the op-amps 206, 208, controller and transceiver 300, and possibly other devices. This output is labeled 5V0 throughout the diagrams.

Also considered part of the optional protection circuitry are the transient voltage suppression (TVS) diodes 504, 506, 508 shown in FIG. 2. These may be 3.3 volt reverse standoff voltage diodes that allow for sufficiently high voltages on the input CAN bus low wire 128 and input CAN bus high wire 126 not to interfere with normal operation of the input CAN bus 120 but will ground any higher voltage than 3.3 V on the low wire 128, 3.3 V on the high wire 126, or more than a difference of 3.3 V between these two. This provides an added degree of protection to the output CAN bus 100 and its associated components.

Figure 6:
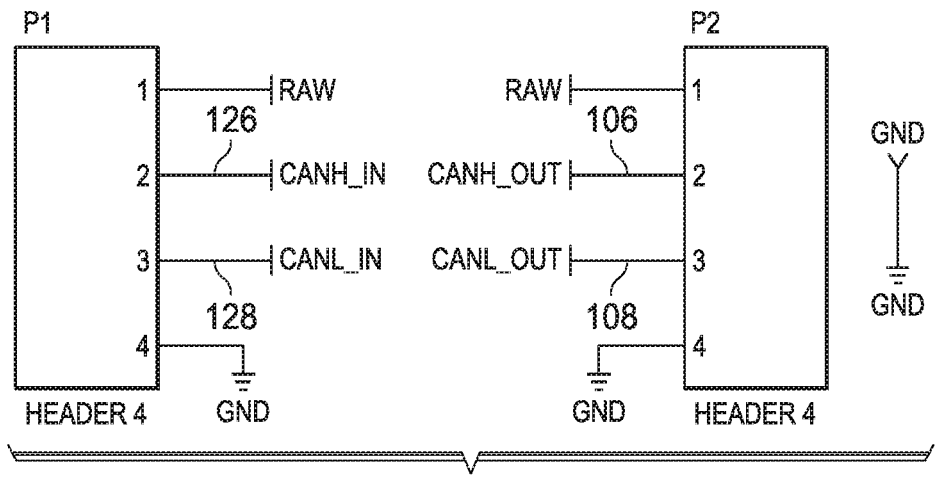
FIG. 6 is a schematic diagram of a suitable set of external connections for a system of the present disclosure as embodied in FIGS. 2-5.

Finally, FIG. 6 is a schematic diagram of a suitable set of external connections for a system of the present disclosure as embodied in FIGS. 2-5. Here various inputs and outputs are labeled including the RAW voltage input, the input CAN bus high wire 126 (CANH_IN), the input CAN bus low wire 128 (CANL_IN), the output CAN bus high wire 106 (CANH_OUT) and output CAN bus low wire 108 (CANL_OUT). Any suitable connector or stub may be used or, where appropriate, the devices may be permanently joined by wiring or soldering. In some embodiments, the device 100 interfaces to a vehicle with a Deutsch 9 pin diagnostics connector.

Various filtering capacitors, diodes, and pull-up/down resistors are shown in the various drawings along with exemplary values for these. The present disclosure is not meant to be limited to the particular values shown and one of skill in the art may readily conceived of alternate configurations for such components. Protections may be built in to the integrated circuits.

Figure 7:
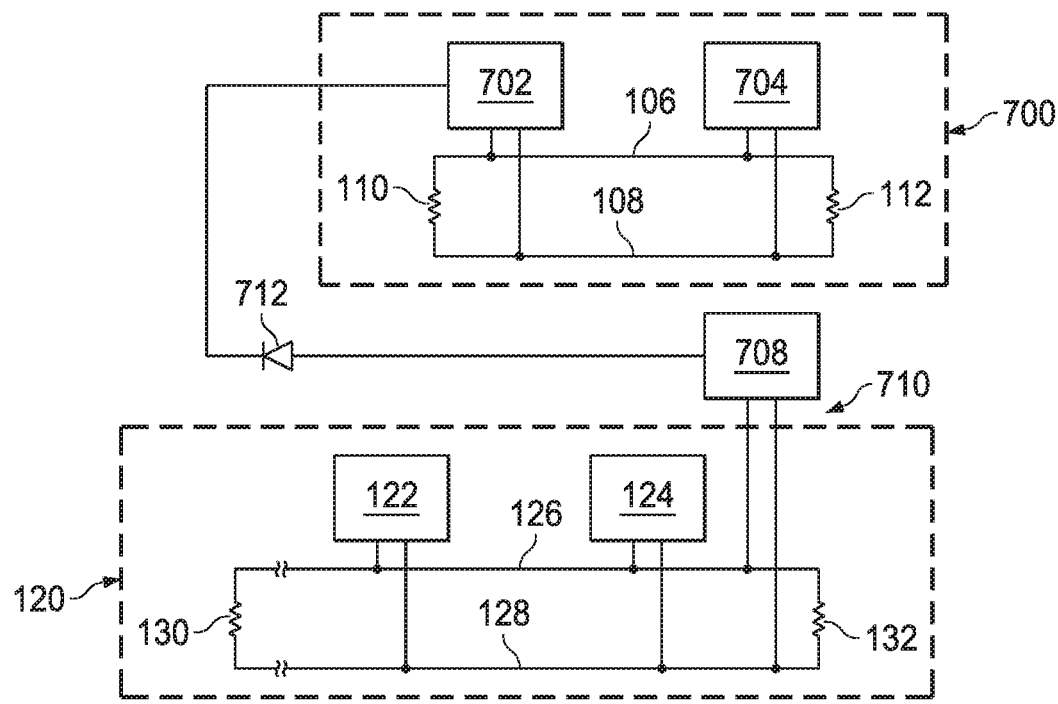
FIG. 7 is a simplified schematic diagram of an arrangement of data bus nodes providing secure access from a first data bus to a second data bus according to aspects of the present disclosure.

Referring now to FIG. 7, a simplified schematic diagram of an arrangement of data bus nodes providing secure access from a first data bus to a second data bus according to aspects of the present disclosure is shown. Here the first data but is the input CAN bus 120 and the second data bus another embodiment of the output CAN bus 100, shown here as output CAN bus 700. The input CAN bus 120 is as previously described and may include two more nodes 122, 124 communicating via a voltage differential on the high wire 126 and low wire 128.

The output CAN bus 700 in the present embodiment also includes two nodes. Here the nodes are a CAN transceiver 702 and a combination CAN controller and transceiver device 704. It should be understood that other nodes may exist on the output CAN bus 700. In the present embodiment, there is a transceiver 708 associated with the output CAN bus 700 but connected to a stub 704 onto the input CAN bus 120. As connected, the CAN transceiver 708 has full communication ability on the input CAN bus 120. The transceiver 708 is wired for communication with the transceiver 702 on the output bus 700. Therefore data can be placed on the output CAN bus 700 from the input CAN bus 120. Communication between the transceivers 708, 702 is one way from the transceiver 708 to the transceiver 702 as shown by the diode symbol 712. The diode symbol 712, however, may be only a symbol representing a logical function since, as explained below, it may not be implemented with a diode per se.

Figure 8:
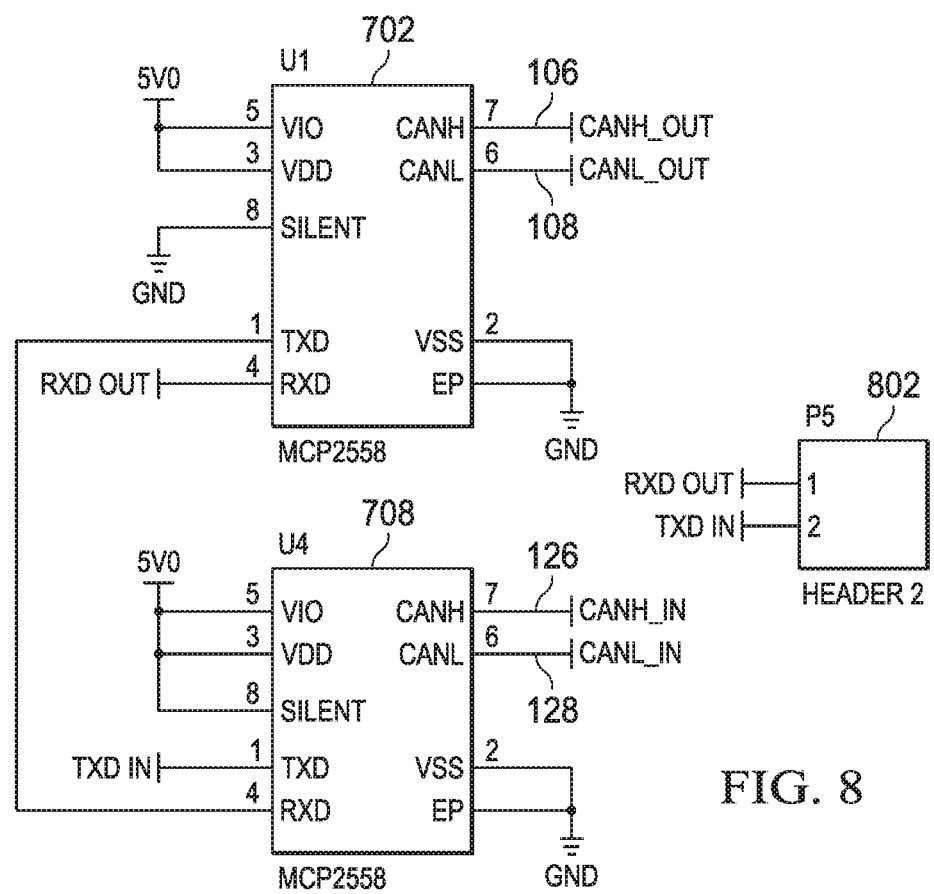
FIG. 8 is a schematic diagram of a pair of transceivers operating as data notes on separate data buses providing secure access from one bus to the other according to aspects of the present disclosure.

Referring now to FIG. 8, a schematic diagram of the pair of transceivers 702, 708 operating as data notes on separate data buses providing secure access from one bus to the other according to aspects of the present disclosure is shown. FIGS. 8-12 taken together illustrate a complete device schematic for implementing a secure CAN bus access. However, each of FIGS. 8-12 are discussed in turn As implemented according to FIG. 8, the transceivers 702, 708 are each Microchip MCP2558 CAN transceivers but other CAN transceiver devices as known in the art may be used. For example, if the CAN bus is a single wire bus, a TTH8056 from Melexis may be deployed. In the present two wire embodiment, the transceivers 702, 708 are configured and wired such that the data received at transceiver 708, as obtained from the input CAN bus 120 is sent to the transceiver 702 and mirrored to the output CAN bus 700. Accordingly, the transceiver 708 is wired to send and receive signal voltages on the input CAN bus high wire 126 (CANH_IN) and the input CAN bus low wire 708 (CANL_IN). The transceiver 702 is wired to send and receive signal voltages on the output CAN bus high wire 106 (CANH_OUT) and the output CAN bus low wire 108 (CANL_OUT).

The receive output (RXD) of the transceiver 708 is wired to the transmit input (TXD) of the transceiver 702 but the transceivers 708, 702 are not wired in any way that would allow data to travel from the transceiver 702 to the transceiver 708. In this way, data flow between the transceivers 702, 708 occurs as if through a diode.

Although the transceivers 708, 702 are not configured to allow communications from the transceiver 702 to the transceiver 708 they would do so if the receive output (RXD) of transceiver 702 were connected to the transmit input (TXD) of transceiver 708. These connections can be placed on a header 802 and a manual switch could be provided that would selectively connect these leads. In such case, the input CAN bus 120 and output CAN bus 700 would essentially constitute a single CAN bus and data could be provided from output CAN bus 700 to input CAN bus 120. Such a configuration might be useful as a selective manual override to systems of the present disclosure at the cost of increasing the ease of defeating the systems of the present disclosure if physical access to the associated vehicle or other protected system is obtained.

It should be understood that one of skill in the art may conceive of additional ways to implement one-way communication between transceivers on adjacent CAN buses. However, with the system and method shown as in FIG. 8, even if one were to surreptitiously or otherwise obtain full control of the transceiver 702 (or the full output CAN bus 700) it would not be physically possible to pass messages onto the input CAN buss 120. It should also be understood that the systems shown and described herein with respect to specific components provided in the schematics are compatible with CAN Flexible Data Rate.

In order for a device such as the MCP2558 used as transceiver 702 to reliably provide data in the context of an output CAN bus, a second node must be utilized if for no other reason than to provide confirmation bits to the transceiver 702 via the output CAN bus (it would not be secure for the transceivers 708 to do so). In the present embodiment, a second node on the output CAN bus 700 is the CAN controller and transceiver device 704.

Figure 9:
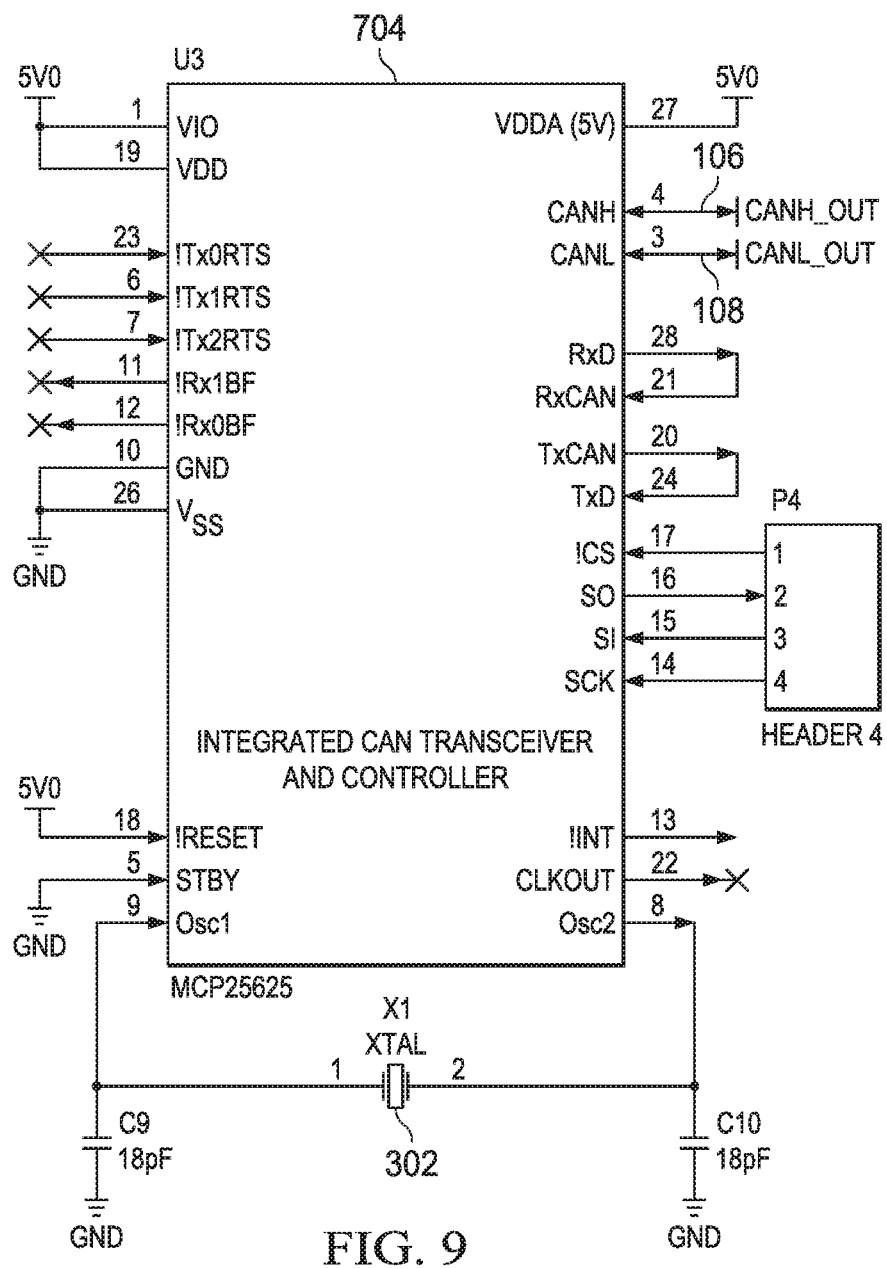
FIG. 9 is a schematic diagram of a controller and transceiver for reporting data obtained securely from a data bus according to aspects of the present disclosure.

Referring now to FIG. 9, is a schematic diagram of the controller and transceiver 704 for reporting data obtained securely from the input data bus 120 and interfacing with the transceiver 704 is via the output CAN bus 700 is shown. Here the CAN controller and transceiver 702 is implemented with a Microchip MCP25625. Where the Microchip MCP25625 is deployed as the controller and transceiver 702, a TXC 7A-16.000MAAJ-T or other oscillator may provide a clock signal.

The controller and transceiver 704 is connected to the output CAN bus high wire 106 (CANH_OUT) and low wire 108 (CANL_OUT) for interfacing with the transceiver 702 or other devices on the output CAN bus 700. Similar to the transceiver 702, the controller and transceiver 704 does not connect the input CAN bus 120. Moreover, the controller and transceiver 704 does not connect to the transceiver 708. In this way, the controller and transceiver 704 can have no effect on the input CAN bus 120. So long as no device on the CAN bus 700 connected to the transmit input of the transceiver 708, the input CAN bus 120 is protected. If the device 700 is constructed correctly, the only way to compromise the input CAN bus 120 using the output CAN bus 700 would be to have physical access to both the input CAN bus 120 and the output CAN bus 700.

Figure 10:
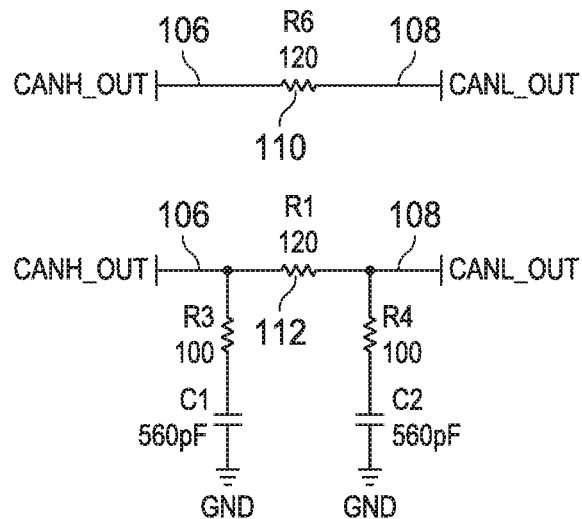
FIG. 10 is schematic diagram of a suitable output data bus from the controller and transceiver of FIG. 9.

Referring now to FIG. 10, a schematic diagram of a suitable output data bus from the controller and transceiver of FIG. 9 is shown. FIG. 10 in particular simply illustrates the additional components necessary to include to meet CAN bus standards (it is understood that in the event the output CAN bus were implemented as a single wire bus, FIG. 10 would differ). The high wire 106 (CANH_OUT) and low wire 108 (CANL_OUT) of the output CAN bus 700 are provided with terminating resistors of 120 ohms each. Additional nodes may be added to the output CAN network by joining to the output high wire 106 and output low wire 108. As explained, additional nodes (without further changes) can have no effect on the integrity of the input CAN bus 120.

Figure 11:
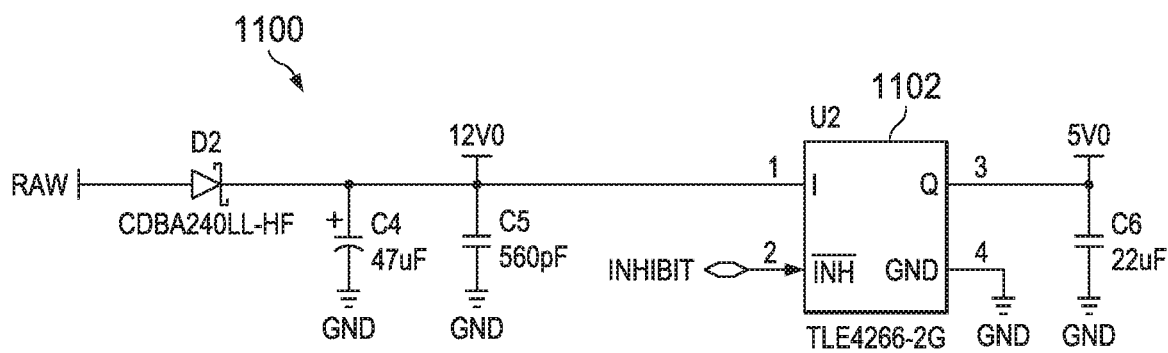
FIG. 11 is a schematic diagram of a suitable power input, protection, and regulation circuit for systems and methods of the present disclosure as embodied in FIGS. 8-10.

Referring now to FIG. 11, a schematic diagram of a suitable power input, protection, and regulation circuit 1100 for systems and methods of the present disclosure as embodied in FIGS. 8-10 is shown. The circuit 1100 is not part of the CAN bus 700 per se and one of skill in the art may conceive of a number of suitable power circuits for the CAN bus 700. However, in the present embodiment, an Infineon TLE4266-2G is utilized as a voltage regulator 1102 that takes an input RAW unregulated voltage (e.g., 12 V vehicle accessory voltage) as an input and provides a regulated output voltage (in this case 5 V) labeled 5V0 throughout the diagrams.

Figure 12:
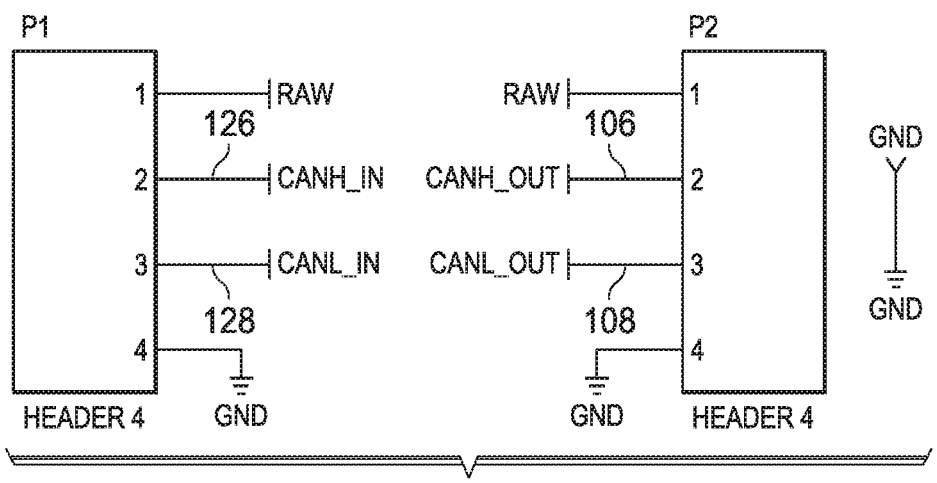
FIG. 12 is a schematic diagram of a suitable set of external connections for a system of the present disclosure as embodied in FIGS. 8-11.

Referring now to FIG. 12, a schematic diagram of a suitable set of external connections for a system of the present disclosure as embodied in FIGS. 8-11 is shown. Here various inputs and outputs are labeled including the RAW input, the input CAN bus high wire 126 (CANH_IN), the input CAN bus low wire 128 (CANL_IN), the output CAN bus high wire 106 (CANH_OUT) and output CAN bus low wire 108 (CANL_OUT). Any suitable connector or stub may be used or, where appropriate, the devices may be permanently joined by wiring or soldering. In some embodiments, the device 700 interfaces to a vehicle with a Deutsch 9 pin diagnostic connector or a J1962 OBD-II diagnostic port.

As with previous embodiments, various filtering capacitors, diodes, and pull-up/down resistors are shown in the various drawings along with exemplary values for these. The present disclosure is not meant to be limited to the particular values shown and one of skill in the art may readily conceived of alternate configurations and/or values for such components.

Figure 13:
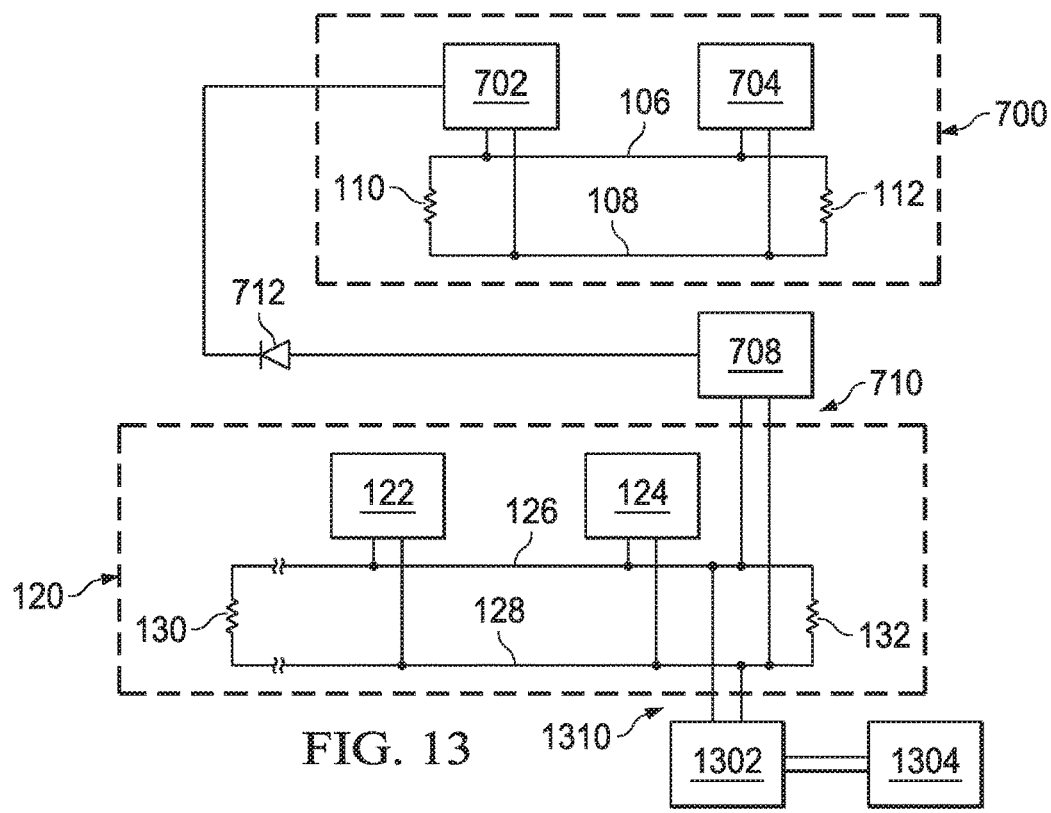
FIG. 13 is a simplified schematic diagram of an arrangement of data bus nodes providing secure access from a first data bus to a second data bus, and an automated secure requestor provided on the first data bus, according to aspects of the present disclosure.

Referring now to FIG. 13 a simplified schematic diagram of an arrangement of data bus nodes providing secure access from a first data bus to a second data bus, and an automated secure requestor provided on the first data bus, according to aspects of the present disclosure is shown. The first data bus is, once again, input CAN bus 120 and the second data but is output CAN bus 700. The CAN buses 120, 100 operate as described above insofar as the node 708 connected to the input CAN bus 120 is a CAN bus transceiver being connected to transceiver node 702 on the output CAN bus 700 in such a way that a one way data bridge is implemented from transceiver 708 to transceiver 702, shown functionally as diode symbol 712. As before, the functionality of this "diode" may be accomplished via the wiring of the nodes 702, 708 as described above with respect to FIG. 8 (e.g., the output of transceiver 708 connected to input of transceiver 702 but not vice versa).

In some cases, including, but not limited to, electronic logging device (ELD) operations, a device connected to the output CAN bus 700 may have need of information that can only be obtained from a device residing on input CAN bus 120. For example, some ELDs require such parameters as vehicle identification number (VIN), which may be broadcast by a controller on the input CAN bus 120 only intermittently or when specifically requested. Another such parameter is engine hours. With regard to any parameter or data that may be needed on the output CAN bus 700, but is not regularly broadcast on the input CAN bus 120 it may be helpful to place a request on the input CAN bus 120 such that the information, data, parameter, etc., will be picked up by transceiver 708 and provided to transceiver 702 for broadcast on the output CAN bus 700. However, allowing any device on the output CAN bus 700 to broadcast anything (including a simple request) onto the input CAN bus 120 undermines the security provided by the systems of the present disclosure.

Accordingly, some embodiments of the present disclosure provide for a mechanism by which parameters that are known to be needed by devices on the output CAN bus 700, but which may not be regularly broadcast on the input CAN bus 120, can be safely requested. Another node 1302 may be provided on the input CAN bus 120 via a stub 1310, thus giving the node 1302 access to write or broadcast to CAN bus 120. The node 1302 may comprise a CAN controller and transceiver such as an MCP25625 or similar. A programmable microcontroller 1304 may be communicatively coupled to the node 1302 to send requests. In some embodiments, the microcontroller 1304 comprises an ATMega328P 8-bit AVR. Those of skill in the art can deploy a wide variety of devices in this role. However, it may be desirable that the microcontroller 1304 not be a part of a general purpose system, or not contain wireless or remote reprograming capabilities. It will be appreciated that since no data bridge, diode, or similar blocks the controller and transceiver 1302, which communicates to the input CAN bus 120 on behalf of the microcontroller 1304, it must be ensured that the controller 1304 is protected against hacking or other remote compromises. As discussed herein, the most reliable way to ensure integrity of such a device, is to sequester it from all remote access.

In order to be useful to draw needed data and other parameters out of devices on the input CAN bus 120 for broadcast on the output CAN bus 700, the microcontroller 1304 may be programmed or coded with whatever commands are needed to request such data. Such data may vary and can include many things. Two examples according to the present disclosure are VIN and engine hours, as might be needed by an ELD accessing the output CAN bus 700. For security reasons, the microcontroller 1304 is not in communication with any device on the output CAN bus 700 (otherwise, it would be conceivably possible for devices on the output CAN bus 700 to write to the input CAN bus 120). Accordingly, the microcontroller 1304 may be programmed to write its requests to the input CAN bus 120 at repeating intervals or as needed.

The delay between requests may vary with application. The requests should be frequent enough devices on the output CAN bus 700 do not become inoperable or enter unacceptable error states between the requests or the receipt of the data or parameters on the output CAN bus 700. On the other hand, the requests should not be needlessly frequent such that the microcontroller 1304 and node 1302 monopolize the input CAN bus 120. In order to facilitate the latter, the microcontroller 1304 may also be programmed to listen to data and parameters on the input CAN bus 120. In some embodiments, only when needed parameters have not been broadcast within a specified length of time will a request be broadcast on the input CAN bus 120. For example, devices already operating on the input CAN bus 120 may periodically broadcast or request a parameter such as engine hours. In such case, the controller 1304 may not request this parameter until a specific amount of time has passed without the parameter appearing on the input CAN bus 120 (and therefore being rebroadcast on the output CAN bus 700 as previously described).

Figure 14:
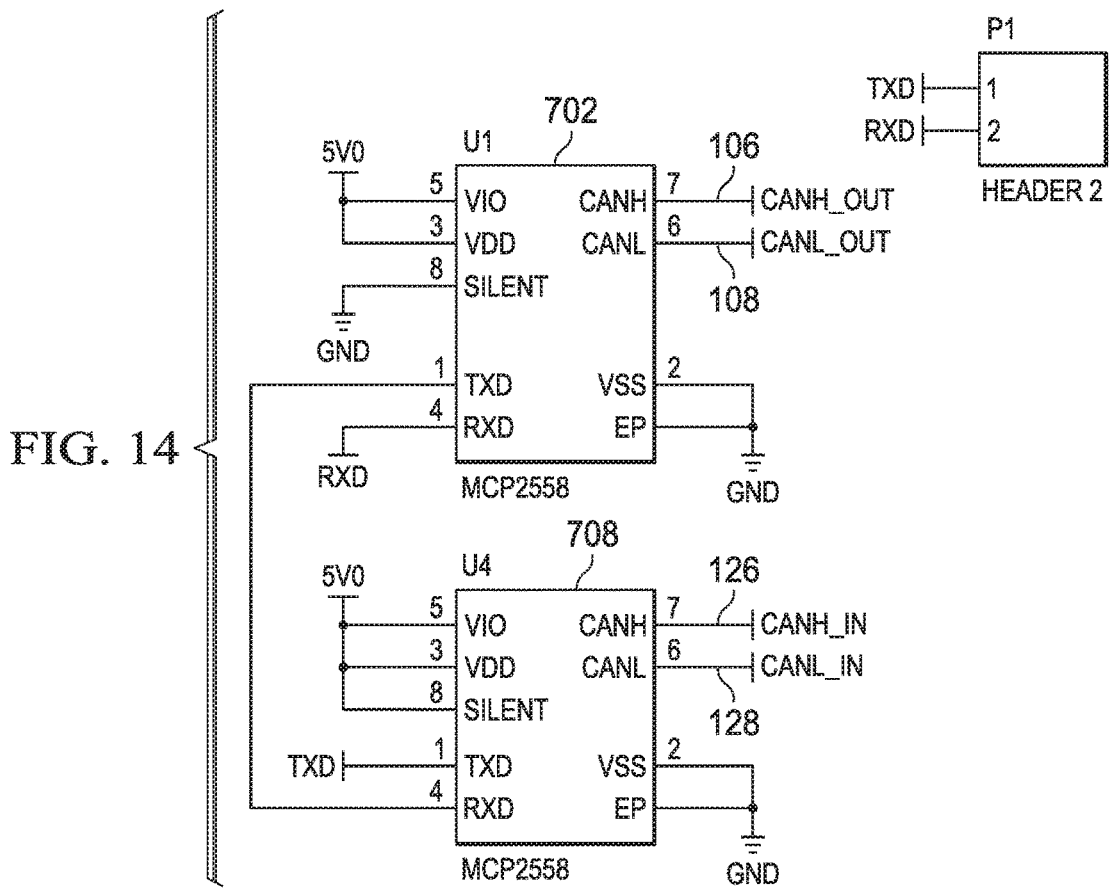
FIG. 14 is another schematic diagram of a pair of transceivers operating as data notes on separate data buses providing secure access from one bus to the other according to aspects of the present disclosure.

Referring now to FIG. 14, another schematic diagram of a pair of transceivers 702, 708 operating as data notes on separate data buses providing secure access from one bus to the other according to aspects of the present disclosure is shown. FIG. 14-20 taken together illustrate a complete device schematic for implementing secure CAN bus access with the ability to provide requests only on the input CAN bus as shown, for example, in FIG. 13. However, each of FIGS. 14-20 are discussed in turn.

As implemented according to FIG. 14, the transceivers 702, 708 are each Microchip MCP2558 CAN transceivers but other CAN transceiver devices as known in the art may be used. Similar to the embodiment of FIG. 8 discussed above, the transceivers 702, 708 are configured and wired such that the data received at transceiver 708, as obtained from the input CAN bus 120 is sent to the transceiver 702 and mirrored to the output CAN bus 700. Transceiver 708 is wired to send and receive signal voltages on the input CAN bus high wire 126 (CANH_IN) and the input CAN bus low wire 708 (CANL_IN). Transceiver 702 is wired to send and receive signal voltages on the output CAN bus high wire 106 (CANH_OUT) and the output CAN bus low wire 108 (CANL_OUT). Output (RXD) of the transceiver 708 is wired to the transmit input (TXD) of the transceiver 702 but the transceivers 708, 702 are not wired in any way that would allow data to travel from the transceiver 702 to the transceiver 708. In this way, data flow between the transceivers 702, 708 occurs as if through a diode. It should be understood that one of skill in the art may conceive of additional ways to implement one-way communication between transceivers on adjacent CAN buses.

Figure 15:
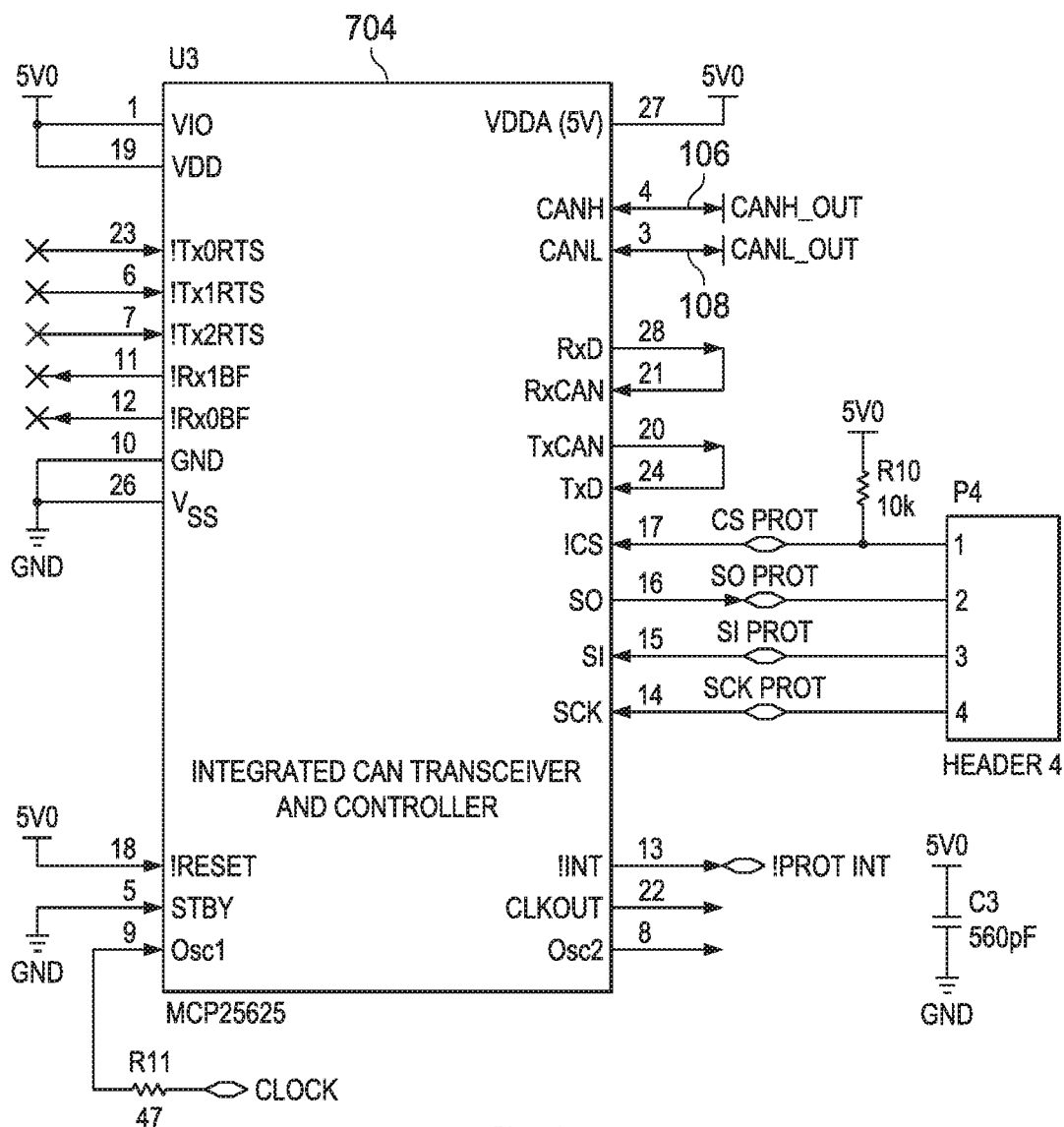
FIG. 15 is another schematic diagram of a controller and transceiver for reporting data obtained securely from a data bus according to aspects of the present disclosure.

Referring now to FIG. 15 is another schematic diagram of a controller and transceiver 704 for reporting data obtained securely from a data bus according to aspects of the present disclosure is shown. Transceiver 704 acts as a second node on the output CAN bus and provides confirmation bits to the transceiver 702 via the output CAN bus (it would not be secure for the transceiver 708 to do so).

Figure 16:
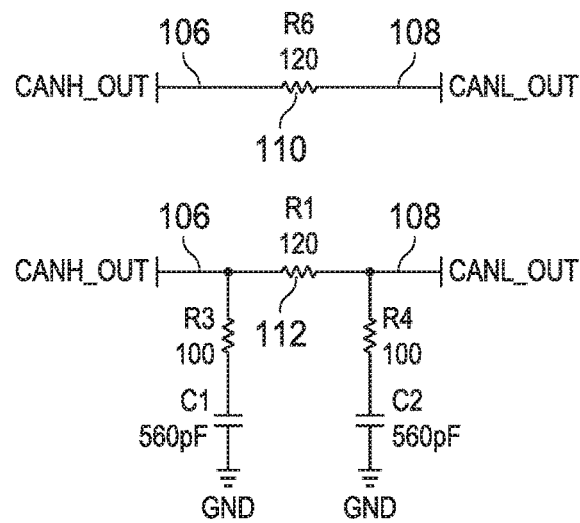
FIG. 16 is a schematic diagram of a suitable output data bus from the controller and transceiver of FIG. 15.

Referring now to FIG. 16, a schematic diagram of a suitable output data bus from the controller and transceiver of FIG. 15 is shown. As is known in the art, the components of FIG. 16 may be used to implement a complete two wire output CAN bus according to the art. A single wire CAN bus can also be implemented as the output CAN bus. In some embodiments, the output CAN bus, even if a two wire configuration, can function with only a single terminating resistor (e.g., resistor 110 may be absent).

Figure 17:
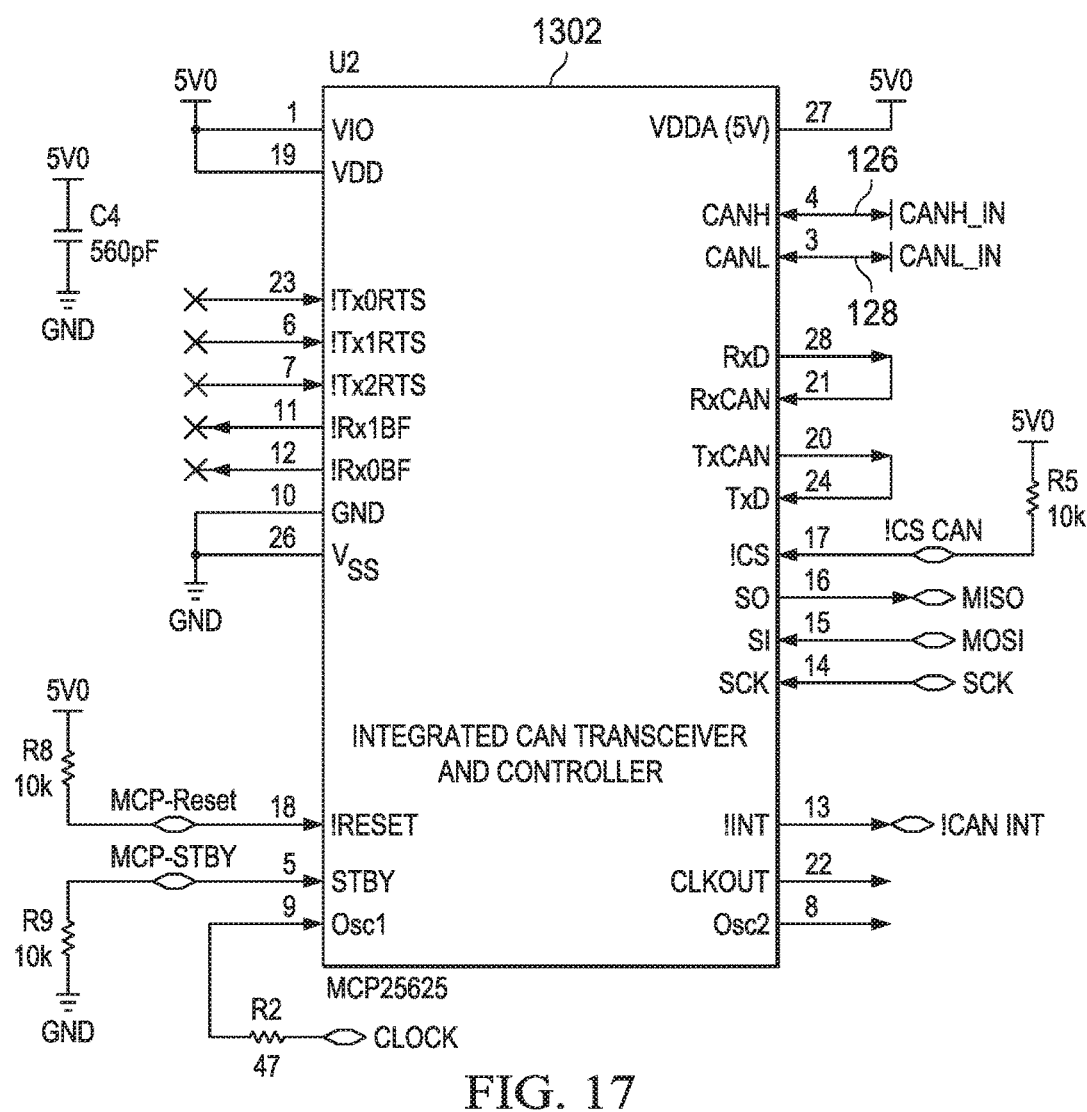
FIG. 17 is a schematic diagram of a controller and transceiver for sending requests to an input CAN bus according to aspects of the present disclosure.

FIG. 17 is a schematic diagram of a controller and transceiver 1302 for sending requests to an input CAN bus according to aspects of the present disclosure. The transceiver 1302 may comprise an MCP25625 or another CAN bus controller and transceiver. The transceiver 1302 is connected to the input CAN bus high wire 126 and to the input CAN bus low wire 128. Thus the transceiver may be used to write data to the input CAN bus 120, which, according to the present disclosure should be protected from a potentially compromised device. Accordingly, in the present embodiment, the transceiver 1302, aside from communicating on the input CAN bus 120, should receive commands or data only from the microcontroller 1304, which should be secured against remote access for maximum security.

Figure 18:
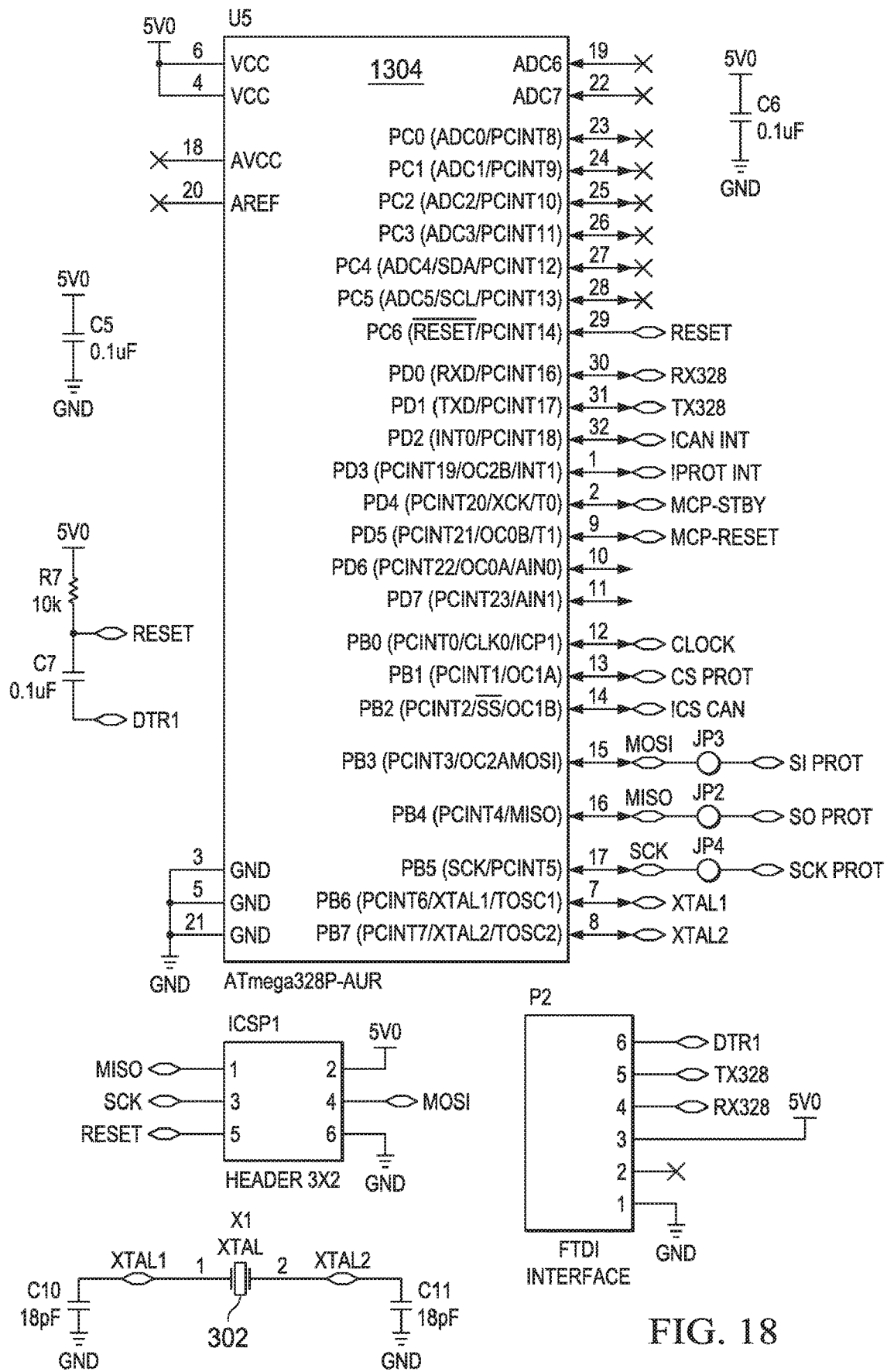
FIG. 18 is a schematic diagram microcontroller for providing requests to the controller and transceiver of FIG. 17.

Referring now to FIG. 18 a schematic diagram of the microcontroller 1304 configured to provide requests to the controller and transceiver 1302 of FIG. 17 is shown. The microcontroller 1304 may be an 8-bit low-cost microprocessor. The ATmega328P is deployed as microcontroller 1304 in the present embodiment, but other devices may be configured for use with systems of the present disclosure as well. As discussed above, the microcontroller 1304 may be secured against remote (e.g., wireless) access and reprogramming. The function of the microcontroller 1304 may be to send specific data requests at periodic intervals to the input CAN bus 120 that may be needed by a device sequestered on the output CAN bus 700, such as engine hours, VIN, or other data.

Figure 19:
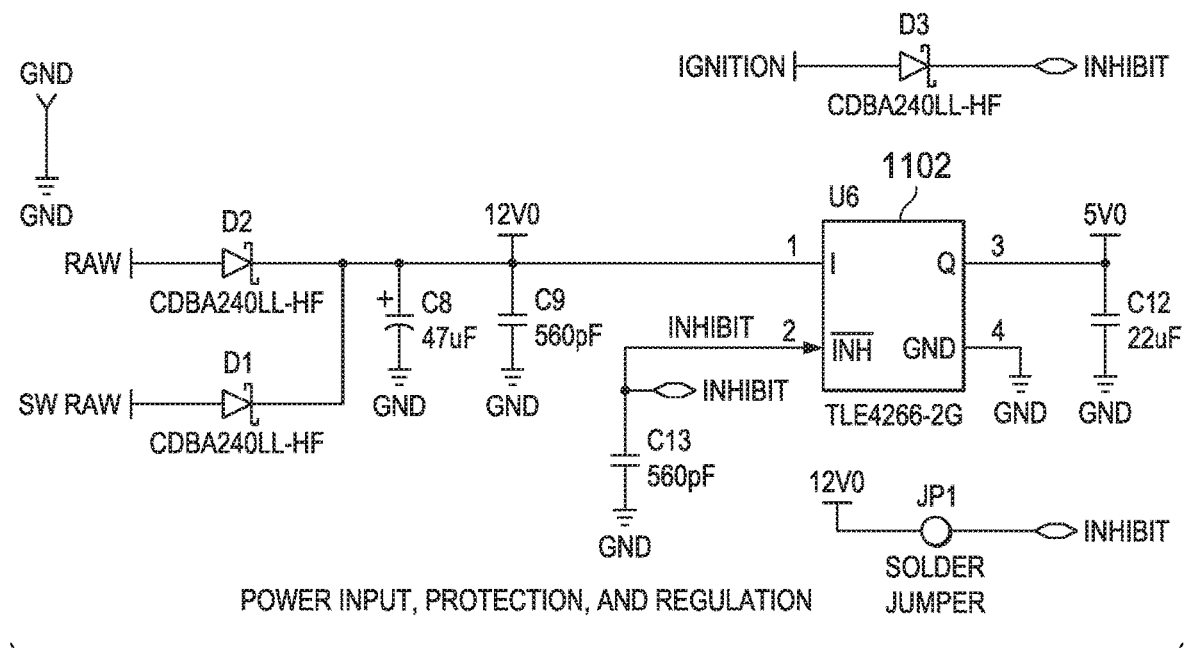
FIG. 19 is a schematic diagram of a suitable power input, protection, and regulation circuit for systems and methods of the present disclosure as embodied in FIGS. 14-18.

Referring now to FIG. 19 is a schematic diagram of a suitable power input, protection, and regulation circuit for systems and methods of the present disclosure as embodied in FIGS. 14-18 is shown. The circuit of FIG. 19 is not part of the system of FIGS. 14-18 per se, meaning that one of skill in the art may conceive of other suitable power circuits without departing from the teachings and implementations of the present disclosure.

Figure 20:
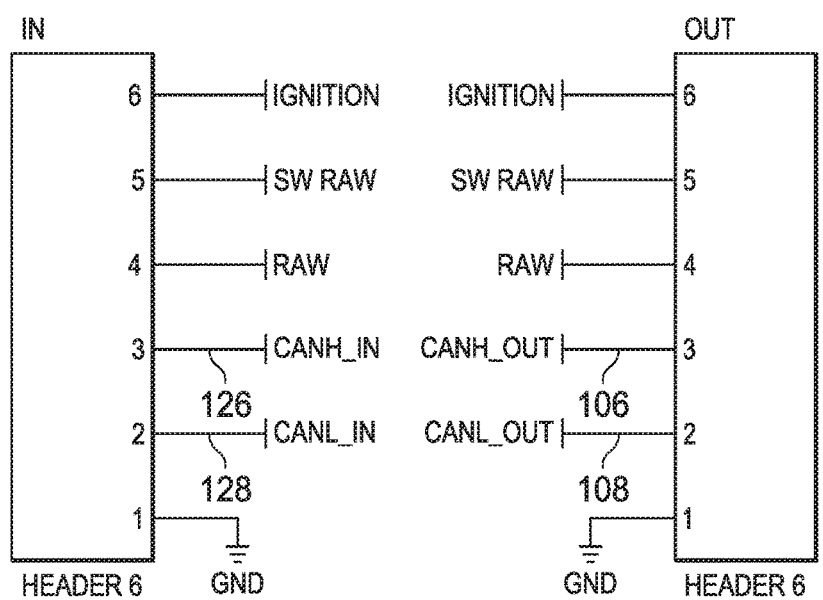
FIG. 20 is a schematic diagram of a suitable set of external connections for a system of the present disclosure as embodied in FIGS. 14-19.

Referring now to FIG. 20, is a schematic diagram of a suitable set of external connections for a system of the present disclosure as embodied in FIGS. 14-19 is shown. The configuration of FIG. 20 differs somewhat from that of FIG. 12 in that switched RAW and ignition connections are provided here. However, it should be appreciated that pinouts and external connections may vary without departing from the inventive aspects of the present disclosure. The embodiments of the present disclosure are not meant to be limited to a specific external pinout unless necessary to the functionality described and/or claimed herein. As with previous embodiments the external connection may physically comprise a Deutsch 9-pin connector or other compatible plug or connector.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A system comprising:
    a first, input controller area network (CAN) including a first data wire;
    a controller area network (CAN) controller and transceiver device implementing a second, output CAN network including at least a second data wire; and
    a first diode interposing the first, input CAN and the second, output CAN such that a signal on the first data wire can propagate to the second data wire of the output CAN network but not vice versa;
    wherein the first CAN and the second CAN are separate controller area networks implementing the same protocol; and
    wherein the second CAN is unable to signal the first CAN.

2. The system of claim 1, wherein the first data wire is a CAN bus high wire.

3. The system of claim 2, wherein the first data wire is a CAN bus low wire.

4. The system of claim 1, wherein the CAN controller and transceiver device implementing the second, output CAN network provides signals received from the first CAN to a separate node of the second CAN.

* * * * *